F. JURKOWSKI.
MACARONI COOKER.
APPLICATION FILED JULY 16, 1917.
1,258,224.
Patented Mar. 5, 1918.
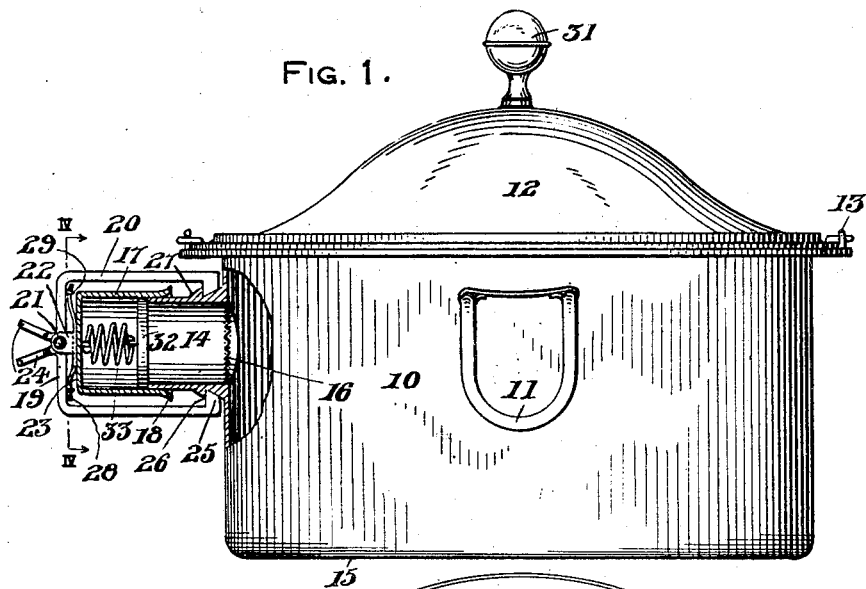
FIG. 1.
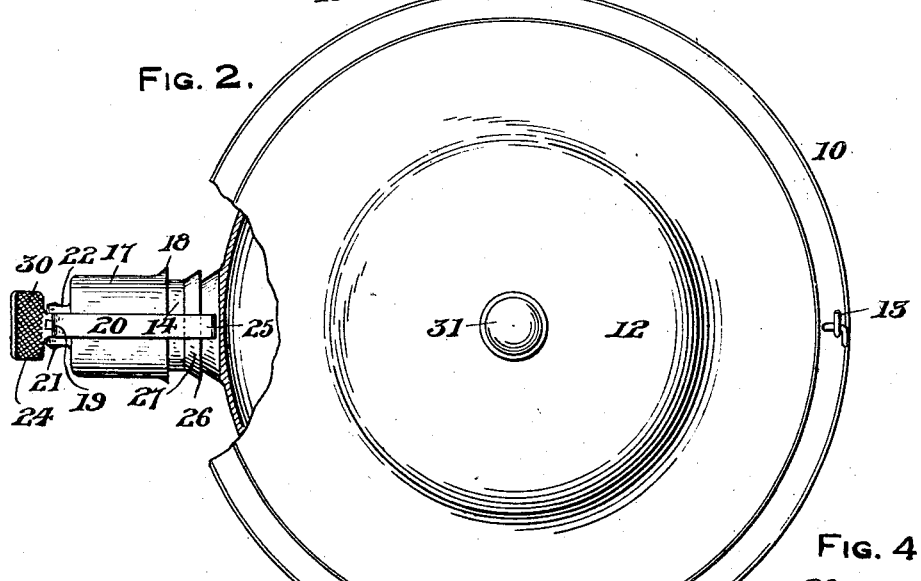
FIG. 2.
FIG. 3.
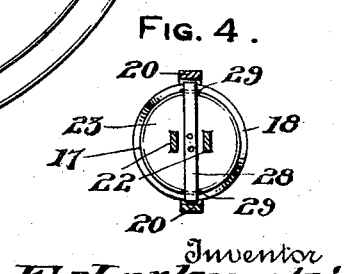
FIG. 4.
Inventor
F. Jurkowski
By
Attorney

UNITED STATES PATENT OFFICE.

FELIX JURKOWSKI, OF CHICAGO, ILLINOIS.

MACARONI-COOKER.

1,258,224.　　　　Specification of Letters Patent.　　Patented Mar. 5, 1918.

Application filed July 16, 1917. Serial No. 180,840.

*To all whom it may concern:*

Be it known that I, FELIX JURKOWSKI, a citizen of Russia, residing at Chicago, in the county of Cook and State of Illinois, have invented certain new and useful Improvements in Macaroni-Cookers, of which the following is a specification.

This invention relates to new and useful improvements in macaroni cookers.

The primary object of the invention is the provision of a kitchen utensil especially adapted for cooking macaroni and having a draining means readily operable without uncovering the utensil.

A further object of the device is to provide a cooker having a side drain for outletting superfluous fluid within the cooker, a removable locking stopper being arranged for permitting the outflow of fluid.

A still further object of the device is to provide a resiliently seated stopper for a spout member having releasable locking means for maintaining the stopper in its operative sealing position upon the spout.

In the drawing forming a part of the application and in which like reference characters designate corresponding parts throughout the several views, Figure 1 is a side elevation of a cooker provided with the present device, the same being shown in section in its operative closing position.

Fig. 2 is a top plan view of the same partially broken away.

Fig. 3 is a sectional view of the stopper detached and

Fig. 4 is a sectional view taken upon line IV—IV of Fig. 1.

The present invention is adaptable for many forms of kitchen utensils and cookers being herein illustrated in connection with a basin form of macaroni cooker 10 having a handle 11 and a lid 12, the latter being maintained in position by means of pairs of hooks 13 whereby the lid may be detached upon a partial rotation thereof.

An outlet spout 14 is provided in one side of the basin 10 at a point suitably elevated above the bottom 15 of the basin and is adapted for pouring off the scum or top layer of fluid within the basin, a wire gauze 16 being preferably arranged at the inner end of the spout 14. My stopper consists of a cup-shaped cap 17 adapted for fitting over the open outer end of the spout 14 and provided with a slightly flaring open mouth 18.

A clamp 19 is provided exteriorly of the cap 17 consisting of opposite angular inclosing jaws 20 pivoted as at 21 to a bracket 22, in the form of spaced lugs arranged at the outer closed end 23 of the cap 17, while the ends of said jaws are widened in the form of handles or plates 24 whereby the clamp member presents the general appearance of a pair of tongs.

The jaws 20 terminate in inwardly extending teeth 25 for engaging over an annular retaining shoulder 26 upon the spout 14 arranged with an inclined outer surface 27 permitting the teeth 25 to pass thereover for seating behind the shoulder 26. A spring 28 is carried by the cap end 23 having sliding engagement with the clamp jaws 20 as at 29 for normally maintaining the teeth 25 in their engaging positions and tending to approach each other, whereby the clamp will automatically engage the shoulder 26 when the cap 17 is positioned over the open end of the spout 14. It will also be evident that when the device is positioned upon the spout, the plates 24 may be grasped by the fingers of the operator and forced toward each other, thereby separating the teeth 25 and disengaging them from the shoulder 26, whereby the cap 17 may be readily removed from the spout. The outer faces 30 of the plates 24 are preferably roughened for convenience in grasping for operating the clamp while a knob 31 may be arranged upon the lid 12.

A closure disk 32 is shiftably arranged within the cap 17 being connected with the inner face of the end 23 by means of a spring 33. When the cap 17 is positioned upon the open end of the spout 14, the disk 32 is resiliently maintained against the end of the spout by the spring 33, thereby sealing the spout with the cap 17 overlying the end portion of the spout and the clamp 19 maintaining the disk and cap in their operative closing position upon the spout.

It will be evident that when the cooker is in use in cooking such eatables as macaroni, the cap 17 may be readily removed by means of the handles 24 and fluids poured out of the spout 15 from the basin 10 as may be found desirable.

What I claim as new is:—

1. In combination with a cooking basin having an outlet spout, an annular shoulder upon the spout, a cap positioned upon the open end of the spout, a spring pressed disk within the cap seating upon the end of the spout when the cap is arranged upon the latter and a spring pressed manually releasable clamp carried by the outer end of the cap and having overlying engagement with the said shoulder when the device is in its operative position.

2. A cooker comprising a basin, a spout at the side of the basin, a strainer within the spout, a surrounding shoulder upon the spout, a cup-shaped cap fitting over the open end of the spout, a retaining clamp for the cap having jaws spanning the cap and pivotally connected at the closed end of the cap, inwardly extending teeth upon the free-ends of said jaws engaged behind said shoulder when the clamp is in its operative position, resilient closing means for said jaws carried by the cap and finger engaging operating plates attached to said jaws outwardly of the cap.

In testimony whereof I, affix my signature.

FELIX JURKOWSKI.

Copies of this patent may be obtained for five cents each, by addressing the "Commissioner of Patents, Washington, D. C."